United States Patent [19]
Chen et al.

[11] Patent Number: 5,965,224
[45] Date of Patent: Oct. 12, 1999

[54] CLOSURE BAG WITH INTERNAL TACK SURFACES

[75] Inventors: Chih-Hung Chen, Naperville, Ill.; Andrius Dapkus, Danbury, Conn.; Jack A. Mac Pherson, Aurora, Ill.

[73] Assignee: First Brands Corporation, Danbury, Conn.

[21] Appl. No.: 08/554,945

[22] Filed: Nov. 13, 1995

[51] Int. Cl.$^6$ .......................... B65D 33/16; B65D 30/02
[52] U.S. Cl. .................. 428/35.2; 428/35.7; 428/195; 428/475.2; 428/476.1; 428/483; 428/516; 428/518; 383/93; 383/97
[58] Field of Search ................ 383/109, 93, 95, 383/97, 116; 428/35.2, 35.4, 35.6, 474.9, 476.1, 475.2, 483, 516, 35.7, 518, 195

[56] References Cited

U.S. PATENT DOCUMENTS

| | | | |
|---|---|---|---|
| 4,519,095 | 5/1985 | Clayton | 383/86 |
| 4,612,221 | 9/1986 | Biel et al. | 428/35 |
| 4,842,421 | 6/1989 | Bullard et al. | 383/61 |
| 4,905,298 | 2/1990 | Walor | 383/95 |
| 5,250,612 | 10/1993 | Hazlitt et al. | 525/53 |
| 5,360,648 | 11/1994 | Falla et al. | 428/35.2 |

*Primary Examiner*—Rena L. Dye
*Attorney, Agent, or Firm*—Gary L. Wamer

[57] ABSTRACT

A closure bag having a bag body with internal tack surfaces.

15 Claims, 1 Drawing Sheet

CLOSURE BAG WITH INTERNAL TACK SURFACES

FIELD OF THE INVENTION

The instant invention relates to a closure bag having sidewalls with inner surfaces with unique internal "tack" characteristics such that residual air in the bag can be expelled after food or other article is placed in the bag prior to closing the closure by pressing the internal surfaces together such that the surfaces adhere to each other.

BACKGROUND OF THE INVENTION

The use of closure fastening devices for the closure of containers, including plastic bag bodies, is generally known. Furthermore, the manufacture of closure fastening devices (commonly referred to as "closures") comprising adhesive closures or interlocking zipper closures formed from plastic materials is generally known to those skilled in the art relating to closure fastening devices as demonstrated by the numerous patents in this area.

Adhesive closures for bags are disclosed in representative U.S. Pat. Nos. 4,519,095, 4,415,087 and 3,990,627.

Zippers of the type used on plastic bags are well known. Patents which disclose "zippers" and zippers on bags include U.S. Pat. No. 4,186,786, and U.S. Pat. No. 4,285,105, Japanese Patent Application No. 51-27719.

A search of the prior art located the following patents:
U.S. Pat. Nos.
3,160,323
3,198,392
3,260,412
3,353,714
3,504,067
4,518,654
4,842,421
4,963,388
5,049,423
5,147,708

The above prior art relates to containers having internal surfaces with mechanical mating (see: U.S. Pat. Nos. 3,198,392, 3,260,412 and 3,160,323) or tube scoring (see: U.S. Pat. Nos. 3,353,714 and 3,504,067) and to so called cling stretch wraps (see: U.S. Pat. Nos. 4,518,654, 4,963,388, 5,049,423 and 5,147,708). U.S. Pat. No. 4,842,421 relates to a thermoplastic draw tape bag having a tacky surface around the inner periphery of the lip of the open mouth of the bag.

A particularly well-known closure fastening devices is in connection with a flexible container, e.g., bag bodies and are generally referred to as zippers. The closure fastening device and the associated container may be formed from thermoplastic materials, and the closure fastening device and sidewalls of the container can be integrally formed by extrusion as a single piece, or may be formed as separate pieces and then connected by heat sealing or other suitable fastening means.

SUMMARY OF THE INVENTION

The instant invention generally relates to a plastic bag having a closure and a bag body having opposing sidewalls with the inner surfaces of the bag body having at least one tack surface area whereby the two inner surfaces adhere to each other when the surfaces come into physical contact. This adhesive between the inner bag surfaces enables removable of residual air prior to closing the bag's closure. The removal of residual air is generally believed to be beneficial to improved food storage conditions.

DETAILED DESCRIPTION OF THE INVENTION

Figure 1:
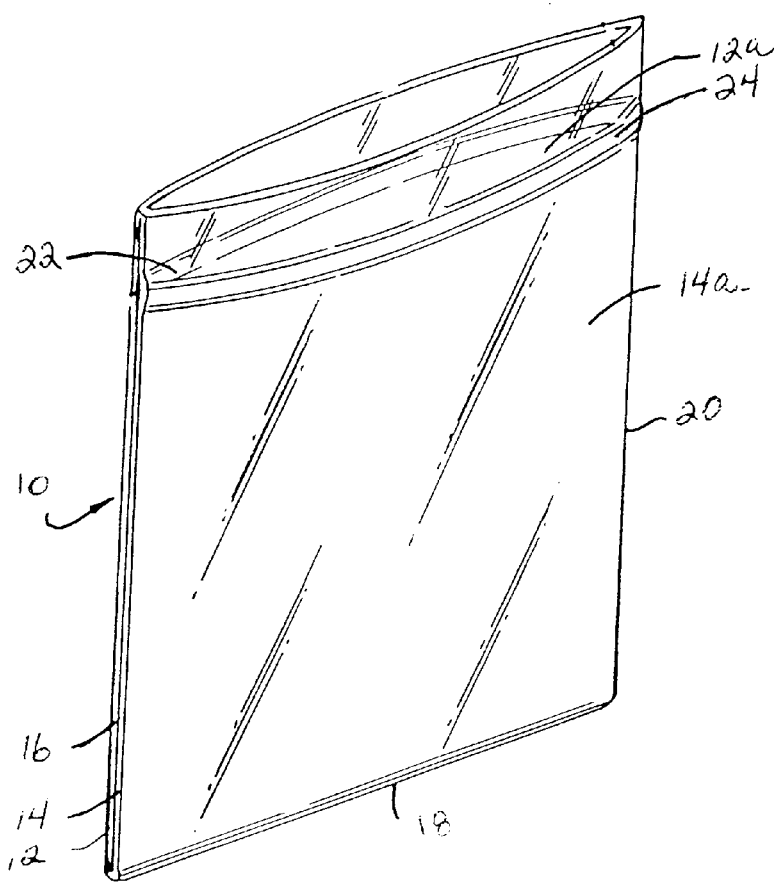
FIG. 1 is a bag having a closure with inner surfaces and outer surfaces.

The instant invention provides a closure bag with means for removing residual air in a bag prior to closure. This is accomplished without the need for additional venting means for forcing air from a closed bag.

The terms "inside" and "outside" are employed herein to refer to the surfaces of the sidewalls of the bag body with the "inside" referring to the side of the sidewall coming into contact with the article placed within the bag.

The "inside" surfaces or "inner" surfaces of the bag body are provided with a unique "tack" characteristic not heretofore employed with closure bags. This "tack" characteristic is provided to facilitate the removal of residual air in an open bag into which an article has been placed. The user of the bag presses the sidewalls on the outside surfaces so that the inside surfaces are in physical contact. As a result of the "tack" characteristic of the two inner surfaces for each other the two surfaces adhere to one another and expel any residual air which would otherwise have remained between spaced apart sidewalls of the bag bodies.

The "tack" characteristic of the inside surfaces of the bag body can be provided by several means with varying levels of "tack" resulting from the selected means of providing the "tack" characteristic. In one embodiment the bag body is formed from a multilayer film having the inside surface formed from a film layer containing a tackifying agent associated with at least a portion of at least one of the two inside surfaces. Tackifying agents include glycerol monooleate, amorphous polypropylene, amorphous polypropylene-ethylene copolymer, polyisobutylene (copolymers of isobutylene and butene), terpene resins, alkali metal stearates, hydrogenated rosins, rosin esters, pressure activated adhesives and the like. One or more of the aforementioned tackifying agents can be blended with resin materials to be extruded as a film layer of a multilayer film or as a single film layer, such resin materials including, low density polyethylenes, linear low density polyethylenes, high density polyethylenes, polypropylenes, ultra low density polyethylenes, amorphous polyethylenes, ethylene vinyl acetates, polyamides, polyesters and mixtures thereof. If the multilayer film has three or more layers the internal layers can be selected to provide moisture barrier or air barrier or other beneficial properties and can include one or more of the above materials and other thermoplastics such as ethylene vinyl alcohol copolymers. Since a bag sidewall formed from a single layer containing one or more tackifying additives will have both the inside and outside surfaces of the bag body with a "tack" characteristic the outside surface in such an embodiment would preferably be treated with a process or chemical to reduce the tack characteristic of the outside surface. For example, the outside surface can be treated with an effective amount antiblock agent to reduce the "amount of" tackiness of a surface. This treatment may be provided by increasing the amount of antiblocking agent added to the resin prior to extrusion. Antiblocking agents useful for this treatment include silicas, talc and the like. Alternatively, a chemical treatment can be provided to the outside surface. Such a chemical treatment would include corona discharge treatment, coating or printing (e.g., with an ink) with a continuous or non-continuous chemical or reducing the tackiness of the outside surface by reaction with other chemical reactants. Although treatment of the outside surface is not required, users of a quantity of the bags seeking to remove a bag from dispensing box will find it beneficial to have a reduced tackiness associated with the outside surface of the bag body.

When the bag sidewalls are a multilayer film the outer layer may be formed from thermoplastic materials such as low density polyethylenes, high density polyethylenes, ultra low density polyethylenes, polypropylenes, polyamides, polyesters, or the like or from a combination thereof. The selection of the outer film material should be such that it doesn't interfere with the inner surfaces of the bag body. Further, mixtures of resins such as high density polyethylene, medium density polyethylene, low density polyethylene, low density polyethylene, linear low density polyethylene and ethylene vinyl acetate may be employed.

The closure of the closure bag may be any closing means appropriate for closing the bag. Well known closing means are zipper type closures and adhesive type closures. Representative of zipper type closures are U.S. Pat. Nos. 3,654,049; 4,186,786; 4,212,337; 4,285,105; 4,295,919; 4,372,014; 4,561,108; 4,561,109; 3,578,813; 4,829,641; 4,907,321; Re. 28,969; 3,338,284; 3,565,147; 4,362,198; 4,484,352; 4,516,268; 5,252,281; 5,138,750; 5,140,727; 5,070,584; European Patent Application No. 510,797 (published Oct. 28,1992); 4,929,487; 4,858,286; 4,363,345; 5,198,055 and 5,356,222, incorporated herein by reference thereto. Representative of adhesive type closures are U.S. Pat. Nos. 4,519,095; 4,415,087; 3,990,627; 3,942,713; 3,085,738; 3,670,876; 3,806,024; 4,410,130; 4,502,599; 4,785,940; 4,842,421; 4,902,142; 4,947,525 and 5,078,509, incorporated herein by reference thereto. The actual closure means is selected to provide a bag which is suitable for the intended use. If the bag is intended for use as a food storage bag the closure means should be as close to "air tight" as possible to minimize air introduction into the bag from the atmosphere outside the bag. Accordingly, a zipper type closure is typically selected owing to the ability of zippers to keep substantially all of the air out of the bag after closure and owing to their ability to be repeatedly reopened and closed.

In practice, zipper bags are formed such that the zipper is integrally formed with the sidewalls of the bag, or connected to a container, by the use of any of many known methods. A thermoelectric device can be applied to a film in contact with a flange portion of a zipper or the thermoelectric device can be applied to a film in contact with the base portion of a zipper having no flange portion, to cause a transfer of heat through the film to produce melting at the interface of the film and the flange portion or base portion of the zipper. The bonding of the zipper to the film stock may be carried out either before or after the film is U-folded but in any event is done prior to side sealing the bags at the edges by conventional thermal cutting. The thermoelectric device can be heated rotary discs, or resistance heated slide wires, or traveling heater bands, or the like. The connection between the film and the zipper can also be established by the use of hot melt adhesives, or hot jets of air to the interface, or ultrasonic heating, or other known methods.

Generally, the zipper and the films that form the body (having opposing sidewalls) of the bag can be made from a heat sealable material so that a container can be formed economically by heat sealing the aforementioned components to form the container using thermoplastics of the type aforementioned for formation of the closure elements. The typical thickness of a bag sidewall is well known in the art and is typically between about 0.5 mil and about 5 mils and more typically between about 1 mil and 3 mils.

Generally, the closure fastening device of this invention can be manufactured in a variety of forms to suit the intended use. In addition, the two closure elements of the zipper can be positioned on opposite sides of a film.

In evaluating the instant invention a series of closure bags were prepared using the following resin materials and tackifying additives:

Resins
Low Density Polyethylene ("LDPE")
High Density Polyethylene ("HDPE")
Linear Low Density Polyethylene ("LLDPE")
Tackifying Additives:
Polyisobutylene ("PIB")
Ethylene Vinyl Acetate ("EVA")

Six (6) two layer bag films were made having the following inside film and outside film by coextruding the two layer film on a slot casting extrusion line and having a thickness of 3.0 mils with the thickness ratio of the inside film layer to outside film layer being about 1.

The six films were:

Film 1
Inside Film: 87.4 wt % LDPE, 7.6 wt % HDPE and 5 wt % PIB.
Outside Film: LDPE with 5000 ppm fine silica antiblocking additive.

Film 2
Inside Film: 87.4 wt % LDPE, 7.6 wt % LLDPE and 5 wt % of PIB.
Outside Film: Same as for Film 1.

Film 3
Inside Film: 95 wt % LDPE and 5 wt % PIB.
Outside Film: Same as for Film 1.

Film 4
Inside Film: 95 wt % LLDPE and 5 wt % PIB.
Outside Film: Same as for Film 1.

Film 5
Inside Film: EVA
Outside Film: 30 wt % HDPE, 30 wt % LDPE and 40 wt % LLDPE.

Film 6
Inside Film: 94 wt % EVA and 6 wt % PIB.
Outside Film: 30 wt % LDPE and 70 wt % LLDPE.

Each of the above films were formed into zipper bags of the type shown in FIG. 1 where the inside of the bag had sidewalls with opposing inside films. The zipper was of the type claimed in U.S. Pat. Nos. 4,829,641 and 4,907,321, incorporated herein by reference thereto. The bags were tested by placing an eight ounce steak in an open bag and pressing the inside surfaces into contact to expel residual air from the internal area of the bag not occupied by the steak. Each of the bags tested was observed to provide the internal tack characteristic of the instant invention wherein the inside surfaces of the bag body adhered to each other upon coming into physical contact. The magnitude of the adherence varied as among the six different films with film 6 providing a very high adhesion between the inner surfaces with film 2 providing a lesser adhesive force but being preferred owing to ease of use.

Referring to FIG. 1, a closure bag 10 is shown having a first sidewall 12 and a second sidewall 14, each sidewall having an inside surface and an outside surface with inside surface 12a of first sidewall 12 shown and outside surface 14a of second sidewall 14 shown. Closure bag 10 is formed with side seals at 16, 18 and 20 to form a bag body with a closure means having closure element 22 and 24. According to this invention the inner surface of at least one sidewall 12 (shown as 12a) and 14 (not shown) has a tacky surface such that when placed into physical contact the surfaces stick to one another.

What is claimed is:

1. A closure bag comprising a closure means and a bag body having two sidewalls below said closure means, each sidewall having an opposing inner surface and an outer surface, said respective opposing inner surfaces of said bag body arranged to permit physical contact and characterized as adhering when placed in physical contact to displace air in said bag body prior to closing of said closure means, whereby residual air is removed from said bag body prior to closing the closure means and remains displaced by the adherence of said inner surfaces of said bag body.

2. A closure bag according to claim 1 wherein said sidewalls are a single layer of thermoplastic containing a tackifying agent.

3. A closure bag according to claim 1 wherein said sidewalls comprise multilayer films with at least one inner surface layer containing a tackifying agent selected from the group consisting of glycerol monooleate, amorphous polypropylene, amorphous propylene-ethylene copolymer, polyisobutylene, terepene resins, alkali metal stearates, hydrogenated rosins, rosin esters and mixtures thereof.

4. A closure bag according to claim 3 wherein said inner sidewall layer is formed of a least one plastic selected from the group consisting of low density polyethylenes, linear low density polyethylenes, high density polyethylenes, polypropylene, ultra low density polyethylene, amorphous polyethylene, polyamides, polyesters and ethylene vinyl acetate.

5. A closure bag according to claim 4 wherein said inner sidewall layer is formed from a plastic selected from the group consisting of:
1) a mixture of LDPE, HDPE and PIB;
2) a mixture of LDPE, LLDPE and PIB;
3) a mixture of LDPE and PIB;
4) a mixture of LLDPE and PIB;
5) EVA; and
6) a mixture of EVA and PIB.

6. A closure bag according to claim 2 wherein said sidewall contains a tackifying agent added to a plastic selected from the group consisting of low density polyethylenes, high density polyethylenes, ultra low density polyethylenes, polypropylenes, polyamides and polyesters.

7. A closure bag according to claim 5 wherein said outside layer of said multilayer film is selected from the group consisting of:
1) LDPE;
2) a mixture of HDPE, LDPE and LLDPE; and
3) a mixture of LDPE and LLDPE.

8. A closure bag according to claim 3 wherein said outside layer contains an effective amount of an antiblocking additive.

9. A closure bag according to claim 1 wherein said closure is a zipper closure.

10. A closure bag according to claim 1 wherein said closure is an adhesive closure.

11. A closure bag according to claim 2 wherein said sidewalls are a single layer film and the outside surface has been treated to reduce the adherence property of the film as compared to the adherence property as between the inner surfaces.

12. A closure bag according to claim 11 wherein said outer surface is treated by a treatment selected from the group consisting of corona discharge chemical treatment, printing or coating to reduce the tackiness of the outer surface.

13. A closure bag according to claim 1 comprising a zipper closure and a bag body having two sidewalls, each sidewall having an inner surface opposing the inner surface of the other sidewall, each sidewall having an outer surface; each sidewall comprising a two layer film, an inner film layer and an outer film layer having a surface with said inner surface of each sidewall comprising an inner film containing a tackifying agent to permit adherence therebetween upon physical contact and said inner surfaces.

14. A closure bag according to claim 13 wherein:
said tackifying agent is selected from the group consisting of glycerol monooleate, amorphous polypropylene, amorphous propylene-ethylene copolymer, polyisobutylene, terepene resins, alkali metal stearates, hydrogenated rosins, rosin esters and is added to a film formed from at least one of the group consisting of low density polyethylenes, linear low density polyethylenes, high density polyethylenes, polypropylene, ultra low density polyethylene, amorphous polyethylene, polyamides, polyesters and ethylene vinyl acetate; and
said outer film layer is selected from the group consisting of low density polyethylenes, high density polyethylenes, ultra low density polyethylenes, polypropylenes, polyamides and polyesters.

15. A closure bag comprising a closure means and a bag body having two sidewalls below said closure means, each sidewall having an inner surface and an outer surface, said respective inner surfaces and stick to one another when placed in physical contact, said bag opposing inner surfaces formed from a plastic selected from the group consisting of:
1) a mixture of LDPE and HDPE;
2) a mixture of LDPE and LLDPE;
3) a mixture of LDPE and PIB;
4) a mixture of LLDPE and PIB;
5) EVA; and
6) a mixture of EVA and LLDPE;
whereby upon being placed in physical contact residual air in the bag body is removed from said bag body prior to closing the closure bag's closure means, and said outer surface is formed of a plastic selected from the group consisting of:
1) LDPE;
2) a mixture of HDPE, LDPE and LLDPE; and
3) a mixture of LDPE and LLDPE.

* * * * *